Aug. 19, 1924.

O. EPPENSTEIN 1,505,877

TELEMETER

Filed Aug. 13, 1921

Inventor:
Otto Eppenstein

Patented Aug. 19, 1924.

1,505,877

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

Application filed August 13, 1921. Serial No. 492,106.

(GRANTED UNDER THE PROVISIONS OF THE ACT OF MARCH 3, 1921, 41 STAT. L., 1313.)

*To all whom it may concern:*

Be it known that I, OTTO EPPENSTEIN, a citizen of the German Empire, residing at Jena, Germany, have invented a new and useful Telemeter (for which I have filed an application in Germany, August 9, 1918), of which the following is a specification.

The present invention relates to a telemeter, destined for measuring the range from air-crafts and provided with a deflecting device, allowing of altering the relative position of two images of the object to be measured, which are presented to the observer.

The object of the said invention is to construct the telemeter in such a way that on a range scale, coupled to the deflecting device of the telemeter, the range from the object to be measured is correctly indicated in each particular case, provided the deflecting device has been adjusted for the object to be measured and that, by altering the elevation of the telemeter, the adjustment of the deflecting device is automatically modified in such a way that the relative position of the two images, presented to the observer, remains stationary in the direction of the baseline, when the telemeter, with an invariable height of the object to be measured, is directed to it.

Figure 1:
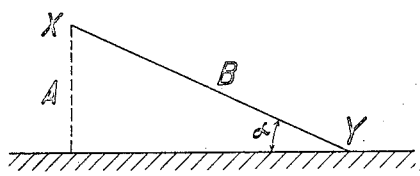
Figure 2:
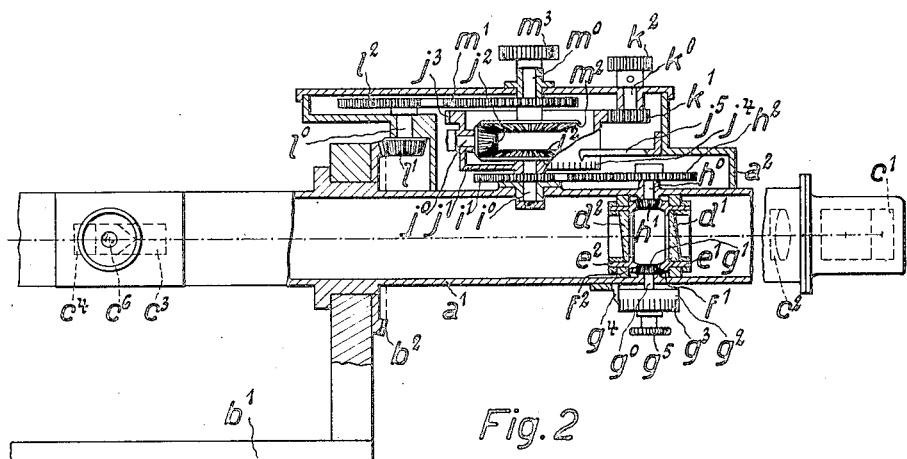
Figure 3:
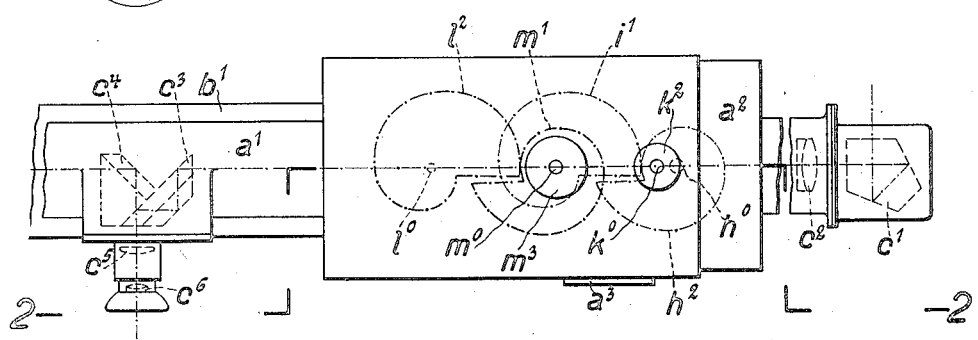

In the annexed drawing Fig. 1 shows a model of the theoretical principle of the invention, whilst Figs. 2 and 3 illustrate a constructional example. Fig. 2 is partly a front view, partly a section on the line 2—2 of Fig. 3. Fig. 3 is a plan elevation.

For this purpose the new telemeter has been constructed as follows: The one of the two crown wheels of a differential gear is so coupled to a body, the position of which relative to the vertical line is invariable, that, when altering the elevation of the telemeter, the deflection of the said crown wheel from a certain original position is always proportional to the logarithm of the sine of the angle of sight of the object just observed, whereby the angle of sight is reckoned from the horizontal direction of look-out. In addition, the other of the two crown wheels is so coupled to the deflecting device that its reflexion from a certain original position is always proportional to the logarithm of the range, which is indicated in each particular case on the range scale of the telemeter according to the position of the deflecting device. Finally, the planet pinion of the differential gear is coupled to an actuating device, allowing of rotating the planet pinion about the joint axis of the crown wheels. Let the height of an object X above the horizontal plane, containing the observer Y, be denoted by A (vide Fig. 1 of the annexed drawing), the distance of the object from the observer by B and the angle of sight of the object by $\alpha$. If the telemeter be adjusted at any angle of sight $\alpha$, the rotation $\epsilon_1$ of the first crown wheel from its original position is proportional to the sine of the angle of sight, hence it is $\epsilon_1 = M_1 \log \sin \alpha$, $M_1$ being a constant.

If, at the same time, any range be indicated on the range scale, the second crown wheel has a rotation $\epsilon_2$, according to the equation $\epsilon_2 = M_2 \log B$, $M_2$ again being a constant.

It may be taken $$M_2 = M_1$$

since the longitudinal unit, on which the range is to be based, is optional. The deflexion $\epsilon_3$ of the planet pinion from its original position is according to the equation $$\epsilon_3 = M_1 (\log \sin \alpha + \log B),$$

since $$\epsilon_3 = \epsilon_1 + \epsilon_2 = M_1 \log \sin \alpha + M_1 \log B.$$

Now, however, is $$A = B \sin \alpha,$$

therefore $$\log A = \log \sin \alpha + \log B,$$

consequently $$\epsilon_3 = M_1 \log A.$$

The position of the planet pinion is, therefore, proportional to the height of the object observed. By adding to the planet pinion a logarithmic height scale of a corresponding size, it is even possible to read off on the same the height of the object to be measured. Inversely, by securing the planet pinion and by directing the telemeter to an object, which moves at the height, corresponding to the position of the planet pinion, the distance of the respective object is continuously and correctly indicated on the range scale and consequently the deflecting device is also continuously so adjusted that its adjustment corresponds to the distance of the object in each particular case. If, therefore, the actuating device of the planet pinion be stopped, or if the said device be so devised as to stop automatically, the telemeter fulfils the above mentioned task. As the logarithm of the sine of the angle of sight would assume for the value zero of the angle of sight the value $-\alpha$, the telemeter cannot be constructed according to the invention for very small angles of sight; for corresponding reasons the range of distance, within which the telemeter is devised according to the invention, cannot extend to the values zero and infinity.

By coupling the crown wheel, coupled to the invariable body, in such a way to an actuating device that motions of the latter correspond to proportional motions of the crown wheel (which, e. g. will take place if the shaft of the said crown wheel be provided with an actuating knob), the telemeter will thereby obtain an adjusting device in elevation which is well suited for the requirements of the observation of aircrafts. For, the said crown wheel being so coupled to the invariable body that its deflection is proportional to the logarithm of the sine of the angle of sight, the alterations of deflection, corresponding to the same alterations of the angle of sight with a small angle of sight are large in comparison with those with a large angle of sight; inversely, to the same displacements of the actuating device of the crown wheel with a small angle of sight, there correspond alterations of the angle of sight, which are small in comparison with those with a large angle of sight. This conforms well to the needs of observation of air-crafts, inasmuch as with an invariable speed of an air-craft, moving at one and the same height, the angle of sight changes the faster, the larger it grows.

If the object to be observed moves at approximately one and the same height, according to the object of the new telemeter, even in the case of a considerable change of the distance of the object, only slight displacements of the actuating mechanism of the planet pinion are necessary, in order to adapt to the changes of the relative position of the two images, caused by the rotation in elevation of the telemeter, those slight improvements which correspond to the slight deviations in the height position of the object. If, however, an object which changes little its distance but considerably its height, be concerned, it would be necessary, when using the actuating mechanism of the planet pinion for the maintenance of the relative position of the two images, to displace the said actuating mechanism of the planet pinion by large amounts. The said inconvenience is removed by providing the telemeter, apart from the actuating mechanism of the planet pinion, with an actuating mechanism, which is so coupled to the deflecting device, that to motions of the said actuating mechanism there correspond proportional motions of the deflecting device. For, only slight motions of the deflecting device being requisite for slight changes of the distance, the said actuating mechanism need only be displaced by small amounts in the case referred to.

In lieu of a differential gear in the ordinary sense any other gear, causing a summation, may be used. Hence, for instance, a gear may be used in which the two crown wheels are replaced by racks and the planet pinion is moving to and fro instead of making a rotating motion.

Finally, the use of the invention does not only apply to those telemeters, containing the base-line within themselves, but in the same way to telemeters, operating with the base line at the target.

Figs. 2 and 3 of the annexed drawing represent as a constructional example the essential parts of a uniocular telemeter, containing the base-line within itself according to the invention. The body $a^1$ of the telemeter is rotatably located in a fork $b^1$ only partly shown in the drawing and provided at the bottom with a fastening pivot $b^0$.

The right entrance reflector system of the telemeter is formed by an optical square-prism $c^1$; the right objective is marked $c^2$. The members of the separating prism-system are denoted by $c^3$ and $c^4$, those of the ocular by $c^5$ and $c^6$. The deflecting device of the telemeter consists of two refractive wedges $d^1$ and $d^2$. The mount $e^1$ of the wedge $d^1$ is provided with a bevel wheel gearing $f^1$, and the mount $e^2$ of the wedge $d^2$ with a bevel wheel gearing $f^2$. A bevel wheel $g^1$ engages in the said two gearings. A drum $g^2$ is fixed to the shaft $g^0$ of the bevel wheel $g^1$ and carries a range scale $g^3$, to which belongs a pointer $g^4$, fitted to the body $a^1$. A knob $g^5$ serves for actuating the bevel wheel $g^1$. Moreover, in the gearings $f^1$ and $f^2$ there engages a bevel wheel $h^1$, carrying, within a box $a^2$ attached to the body $a^1$, on its shaft $h^0$ a spur gear $h^2$ with spiral gearing. In the spur gear $h^2$ there engages a spur gear $i^1$, which is located with its shaft $i^0$ within the body $a^1$ and which is also provided with a spiral gearing. On the shaft $i^0$ there is rigidly mounted a bevel wheel $i^2$ and loosely rotatable a drum $j^1$. Within the latter there is rotatably disposed with the aid of a bolt $j^0$, a bevel wheel $j^2$, engaging in the bevel wheel $i^2$. At its outer top margin the drum $j^1$ carries a spur gear system $j^3$, in which engages a spur gear $k^1$, located with its shaft $k^0$ within the box $a^2$ and provided on the said shaft with a driving knob $k^2$. At its outer bottom margin the drum $j^1$ carries a logarithmic height scale $j^4$, to which belongs a pointer $j^5$, attached to the box $a^2$, and which can be read off through a window $a^3$. To the fork $b^1$ there is fixed a bevel wheel $b^2$, embracing the body $a^1$, and engaging in a bevel wheel $l^1$, located within the box $a^2$. On the shaft $l^0$ of the said wheel there is fixed a spur gear $l^2$ with spiral gearing. With the spur gear $l^2$ meshes a spur gear $m^1$ which is located with its shaft $m^0$ within the box $a^2$ and also provided with spiral gearing. In addition, on the shaft $m^0$ there is fastened a bevel wheel $m^2$, engarging in the bevel wheel $j^2$, as well as a driving knob $m^3$.

With a view to adjusting the elevation of the telemeter, the knob $m^3$ rigidly connected to the bevel wheel $m^2$ must be turned. Hereupon, with the aid of the spur gears $m^1$ and $l^2$, there rotates the bevel wheel $l^1$ and consequently, whilst driving the body of the telemeter, drives the bevel wheel $b^2$. The gearings of the spur gears $m^1$ and $l^2$ are so designed that the above mentioned relation always exists between the position of the bevel wheel $m^2$ and the angle of sight of the direction of look out. A rotation of the knob $g^5$ results in a relative rotation of the wedges $d^1$ and $d^2$ and, in addition, by means of the wheels $h^1$, $h^2$ and $i^1$ in a rotation of the bevel wheel $i^2$.

The gearings of the spur gears $h^2$ and $i^1$ are so designed that the aforesaid relation exists between the position of the bevel wheel $i^2$ and the range indicated on the scale $g^3$. The bevel wheel $j^2$, forming conjointly with the bevel wheels $i^2$ and $m^2$ a differential gear, assumes together with the drum $j^1$ such a position that the height of the object of the measurement is indicated on the scale $j^4$ in each particular case, whilst the range is shown on the range scale $g^3$. On the other hand, by holding fast the knob $k^2$, so that the same height is continually indicated on the height scale $j^4$, and by following up an object, moving at the said height, by rotating the telemeter about the pivot $b^0$ and by turning the knob $m^3$, the scale $g^3$ always indicates correctly the continuously variable range.

As, according to the above explanation, the telemeter cannot on the one hand be constructed to an angle of sight of zero and up to an infinitely long range as per the invention but, on the other hand, it being desirable to extend the observation to the said two limits, the constructional example has been so devised that the telemeter can be adjusted according to the angle of sight zero and to the range infinity (vide the annexed drawing), without a correct indication of the elevation being thereby attained. For, at the end of the four spiral gearings circular gearings are provided for which will become operative when the angle of altitude and the range are approaching the said limits. By means of marks it can be indicated, when the circular gearings become operative. The indication of the range on the scale $g^3$ is always correct.

I claim:

1. The combination of a bearing body with a telemeter rotatably supported on this body, the telemeter comprising a deflecting device, adapted to alter the relative position of two images of the object to be measured which are presented to the observer, a range scale and an index fitted to the telemeter relatively to one another, a differential gear fitted to the telemeter and comprising two crown wheels and a planet pinion, a gearing interposed between the said bearing body and one of the two crown wheels and adapted to convert a rotation of the telemeter relatively to the bearing body into a rotation of this crown wheel proportional to the logarithm of the sine of the angle of rotation of the telemeter reckoned from the horizontal direction of sight of the telemeter, another gearing interposed between the said deflecting device and the other crown wheel and adapted to convert the relative movement of the range scale and the index into a rotation of the latter crown wheel proportional to the logarithm of the range indicated in each case on the range scale, and an actuating mechanism, adapted to rotate the said planet pinion about the common axis of the crown wheels.

2. The combination of a bearing body with a telemeter rotatably supported on this body, the telemeter comprising a deflecting device, adapted to alter the relative position of two images of the object to be measured which are presented to the observer, a range scale and an index fitted to the telemeter relatively to one another, a differential gear fitted to the telemeter and comprising two crown wheels and a planet pinion having a logarithmic height scale and an index co-acting with this height scale, a gearing interposed between the said bearing body and one of the two crown wheels and adapted to convert a rotation of the telemeter relatively to the bearing body into a rotation of this crown wheel proportional to the logarithm of the sine of the angle of rotation of the telemeter reckoned from the horizontal direction of sight of the telemeter, another gearing interposed between the said deflecting device and the other crown wheel and adapted to convert the relative movement of the range scale and the index into a rotation of the latter crown wheel proportional to the logarithm of the range indicated in each case on the range scale, and an actuating mechanism, adapted to rotate the said planet pinion about the common axis of the crown wheels.

3. The combination of a bearing body with a telemeter rotatably supported on this body, the telemeter comprising a deflecting device, adapted to alter the relative position of two images of the object to be measured which are presented to the observer, a range scale and an index fitted to the telemeter relatively to one another, a differential gear fitted to the telemeter and comprising two crown wheels and a planet pinion, a gearing interposed between the said bearing body and one of the two crown wheels and adapted to convert a rotation of the telemeter relatively to the bearing body into a rotation of this crown wheel proportional to the logarithm of the sine of the angle of rotation of the telemeter reckoned from the horizontal direction of sight of the telemeter, an actuating mechanism adapted to impart to this crown wheel a motion proportional to the motion of the mechanism, another gearing interposed between the said deflecting device and the other crown wheel and adapted to convert the relative movement of the range scale and the index into a rotation of the latter crown wheel proportional to the logarithm of the range indicated in each case on the range scale, and an actuating mechanism, adapted to rotate the said planet pinion about the common axis of the crown wheels.

4. The combination of a bearing body with a telemeter rotatably supported on this body, the telemeter comprising a deflecting device, adapted to alter the relative position of two images of the object to be measured which are presented to the observer, a range scale and an index fitted to the telemeter relatively to one another, a differential gear fitted to the telemeter and comprising two crown wheels and a planet pinion, a gearing interposed between the said bearing body and one of the two crown wheels and adapted to convert a rotation of the telemeter relatively to the bearing body into a rotation of this crown wheel proportional to the log- relatively to the bearing body into a rotation of the telemeter reckoned from the horizontal direction of sight of the telemeter, another gearing interposed between the said deflecting device and the other crown wheel and adapted to convert the relative movement of the range scale and the index into a rotation of the latter crown wheel proportional to the logarithm of the range indicated in each case on the range scale, and an actuating mechanism, adapted to rotate the said planet pinion about the common axis of the crown wheels, and another actuating mechanism adapted to impart to the deflecting device a motion proportional to the motion of this mechanism.

OTTO EPPENSTEIN.

Witnesses:
PAUL KRÜGER,
RICHARD HAHN.